United States Patent
Morey

(10) Patent No.: US 7,011,124 B1
(45) Date of Patent: Mar. 14, 2006

(54) STUMP GRINDER HAVING AUTOMATIC REVERSING FEED ASSEMBLY

(75) Inventor: Michael Boyd Morey, Shepherd, MI (US)

(73) Assignee: Tramor, Inc., Remus, MI (US)

( * ) Notice: Subject to any disclaimer, the term of this patent is extended or adjusted under 35 U.S.C. 154(b) by 161 days.

(21) Appl. No.: 10/739,576

(22) Filed: Dec. 17, 2003

(51) Int. Cl.
*A01G 23/06* (2006.01)
*B23Q 15/013* (2006.01)

(52) U.S. Cl. .............. 144/334; 144/356; 144/394; 144/24.12; 144/404; 37/302

(58) Field of Classification Search .......... 144/334, 144/356, 382, 392, 394, 404, 420, 24.12; 37/302; 56/10.2 R, 10.3, 10.4; 241/36
See application file for complete search history.

(56) References Cited

U.S. PATENT DOCUMENTS

| | | |
|---|---|---|
| 4,523,892 A | 6/1985 | Mitchell et al. |
| 5,332,964 A | 7/1994 | Ouchi |
| 5,451,869 A | 9/1995 | Alff |
| 5,588,474 A | 12/1996 | Egging |
| 5,845,689 A | 12/1998 | Egging et al. |
| 6,003,570 A | 12/1999 | Falatok et al. |
| 6,014,996 A | 1/2000 | Egging et al. |
| 6,305,445 B1 | 10/2001 | Falatok |
| 6,830,204 B1 * | 12/2004 | Morey .................. 241/34 |
| 2002/0070301 A1 | 6/2002 | Stelter et al. |

OTHER PUBLICATIONS

Carlton 7500 Tow-Behind, 75 hp Deutz Turbo Diesel
Carlton Tow-Behind 4400D Series, 4400 43 hp Deutz Diesel, 4400 57 hp Deutz Turbo Diesel, 4400 75 hp Deutz Turbo Diesel.

* cited by examiner

*Primary Examiner*—Derris H. Banks
*Assistant Examiner*—Shelley Self
(74) *Attorney, Agent, or Firm*—Bliss McGlynn, P.C.

(57) ABSTRACT

A reversing automatic feed assembly for a stump grinder includes at least one sensor adapted to sense excessive load placed on the stump grinder and output a signal thereof. The reversing automatic feed assembly also includes a control system operatively connected to the least one sensor to automatically reverse feed movement of the cutting assembly in response to the signal from the at least one sensor.

22 Claims, 4 Drawing Sheets

STUMP GRINDER HAVING AUTOMATIC REVERSING FEED ASSEMBLY

BACKGROUND OF THE INVENTION

1. Field of the Invention

The present invention relates generally to stump grinders and, more particularly, to a stump grinder having an automatic reversing feed assembly.

2. Description of the Related Art

It is known to provide a stump grinder for grinding undesirable tree stumps. Typically, a stump grinder includes a frame, an engine or other drive mechanism such as a belt tension engagement mounted to the frame, a cutting assembly having a boom pivotally secured to the frame, and a rotatable cutting wheel operatively supported by the boom and driven by the engine. The stump grinder also includes an actuating assembly to move the stump grinder and/or cutting assembly relative to the stump and a control system to control the direction and rate of movement of the actuating assembly. Such actuating assemblies are typically hydraulic in nature, but may also be pneumatic, electronic, or mechanical.

During removal of a tree stump from a landscape, an operator directs the actuating assembly to move the cutting assembly to engage a portion of the stump through the control system. As the cutting assembly engages the stump, the operator will typically laterally advance or feed the rotatable cutting wheel across an upper surface of the stump, grinding away a top portion of the stump. This could also be done vertically, diagonally, or forward and back. Upon completion of a lateral pass across the stump, the operator will adjust the cutting assembly to engage the top surface of the stump and once again direct the rotatable cutting wheel across the upper surface of the stump in a lateral motion. This process is repeated until the stump is completely ground to an acceptable depth, which is typically below a grade of the landscape. Thus, the manner in which the operator directs the actuating assembly through the control system will directly affect the rate at which the cutting assembly will grind a stump.

Accordingly, the productivity of the stump grinder is dependent on the operator to maintain an appropriate rate of speed and depth engagement between the cutting assembly and the stump. Exerting too much force against the stump will slow the rotation of the cutting assembly and overwork the engine, which may result in engine stall or part failure. When the engine stalls or a part fails, the stump grinder may become plugged or otherwise inoperable. As a result, the stump grinder has to be unplugged or serviced, the engine restarted, and then redirected at the stump. This is a relatively time consuming and labor intensive process, resulting in higher costs, which is undesired. Conversely, exerting too little force against the stump will under-work the engine, resulting in a more time consuming process and a loss of productivity, resulting in higher costs.

Conventionally, maintaining a balance between overworking and under-working the engine is based on an operator's sensory perception of a working stump grinder. By way of example, an operator makes a feed rate adjustment based on engine sound or vibration felt in the controls. However, an operator's sensory perception is highly subjective relative to one's skill/experience, ambient conditions, and stump condition, thus, subject to a loss of maximum efficiency.

In an effort to maintain optimum output of a stump grinder, U.S. Pat. No. 6,014,996 to Egging et al. discloses a control system for stump cutters. In that patent, a stump grinding machine has a sensor for sensing a speed of rotation of an engine and a control for controlling movement of a stump cutter toward a stump based on the rotational speed of the engine. Specifically, the rate at which the stump cutter moves toward a stump in increased, decreased, or halted based on engine speed. As the engine becomes overworked, the stump cutter stops advancing or reduces its advancement speed through the stump until the engine speed increases.

One disadvantage of the above stump grinding machine is that the advancement of the stump cutter toward a stump is continued, albeit at a slower rate, when the engine speed begins to decrease. Despite the slower rate, an excessive load may continue to be placed on the engine, which can result in engine stall or component failure. Further, this type of stump grinder also suffers from the disadvantage of delaying engine recovery time since the cutter is still in contact with the stump although at a lower feed rate. Maintaining stump contact when engine speed is decreased may result in engine stall or part failure. Therefore, there is a need in the art to provide a stump grinder that overcomes the above disadvantages by reversing the feed direction of the cutting assembly relative to a stump in response to an excessive load.

SUMMARY OF THE INVENTION

Accordingly, the present invention is a reversing automatic feed assembly for a stump grinder including at least one sensor adapted to sense excessive load placed on the stump grinder and to output a signal thereof. The reversing automatic feed assembly also includes a control system operatively connected to the least one sensor to automatically reverse feed movement of the cutting assembly in response to the signal from the at least one sensor.

In addition, the present invention is a stump grinder including a frame and a cutting assembly operatively supported by the frame. The stump grinder also includes an actuating assembly operatively connected to the frame to actuate operational movement of the cutting assembly relative to the stump. The stump grinder further includes an automatic reversing feed assembly operatively connected to the actuating assembly. The automatic reversing feed assembly includes at least one sensor adapted to sense excessive load on the stump grinder and to output a signal thereof. The automatic reversing feed assembly is adapted to automatically reverse the feed movement of the cutting assembly in response to a signal of excessive load from at least one sensor.

One advantage of the present invention is that an automatic reversing feed assembly is provided for a stump grinder. Another advantage of the present invention is that the automatic reversing feed assembly reverses operational movement of the cutting assembly relative to the stump when an excessive load is placed on the stump grinder. Yet another advantage of the present invention is that the automatic reversing feed assembly reverses the cutting assembly when an excessive load is placed on the stump grinder, waits, and restarts the feed direction of the cutting assembly once the excessive load is terminated. A further advantage of the present invention is that the automatic reversing feed assembly includes a control system that can be used with an actuating assembly that is powered hydraulically, electronically, or pneumatically.

Other features and advantages of the present invention will be readily appreciated, as the same becomes better understood, after reading the subsequent description when taken in conjunction with the accompanying drawings.

DESCRIPTION OF THE PREFERRED EMBODIMENT(S)

Figure 1:
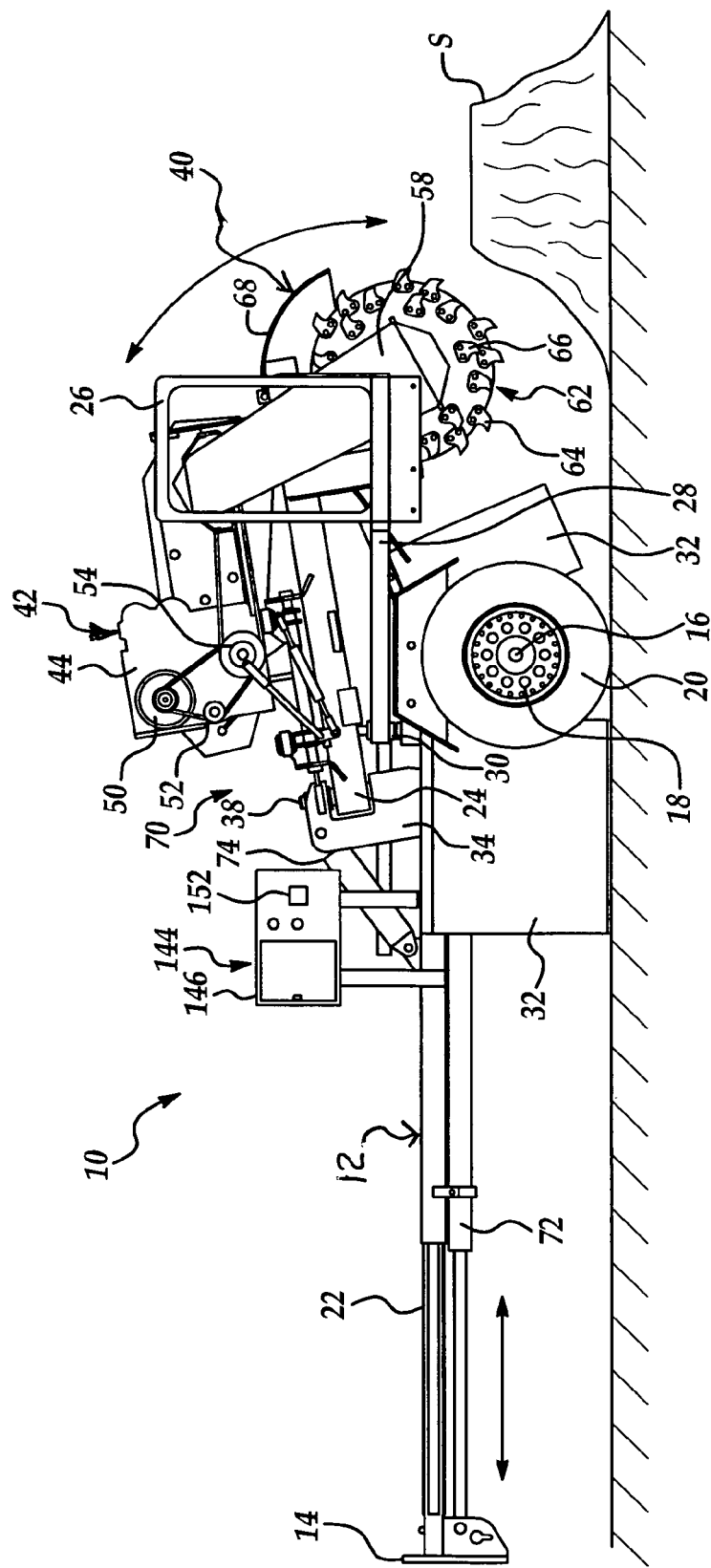
FIG. 1 is an elevational view of an automatic reversing feed assembly, according to the present invention, illustrated in operational relationship with a stump grinder.

Referring now to the drawings and in particular FIGS. 1 through 3A, one embodiment of a stump grinder 10, according to the present invention, is shown. The stump grinder 10 includes a frame, generally indicated at 12. The frame 12 extends longitudinally. The stump grinder 10 includes a hitch assembly 14 at one longitudinal end of the frame 12 to receive a hitch of a vehicle (not shown) for towing behind a vehicle. The stump grinder 10 also includes an axle 16 rotatably supported by the frame 12, wheel rims 18 operatively connected to the axle 16, and tires 20 attached to the wheel rims 18 to facilitate movement of the stump grinder 10 during transportation and movement relative to a stump (S).

As illustrated in FIGS. 1 through 3A, the frame 12 includes a first or lower section 22 and a second or upper section 24 operatively supported by the lower section 22. The lower section 22 includes an operational viewing window 26 and an arm 28 pivotally mounted relative to the frame 12 about a pivot point 30. The operational viewing window 26 is connected to the arm 28. The operational viewing window 26 provides an operator (not shown) of the stump grinder 10 with shielded viewing access during operation. It should be appreciated that the arm 28 may be jointed to further position the operational viewing window 26 or may include a telescoping feature to further extend the operational viewing window 26 relative to the frame 12.

The lower section 22 further includes a flexible curtain 32 that depends hangs from the frame 12 to shield the legs of an operator (not shown) from comminuted stump material that may be thrown during operation. The curtain 32 may extend around the rear and sides of the frame 12 or may exclusively extend below the operational viewing window 26.

Figure 2A:
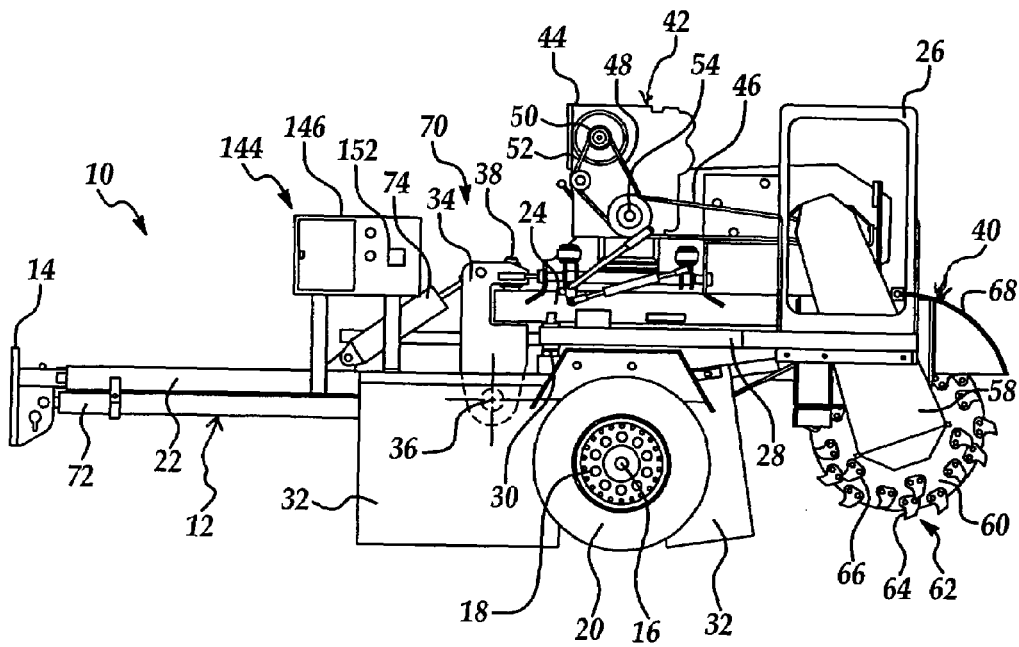
FIG. 2A is a side elevational view of the automatic reversing feed assembly and stump grinder of FIG. 1.
Figure 2B:
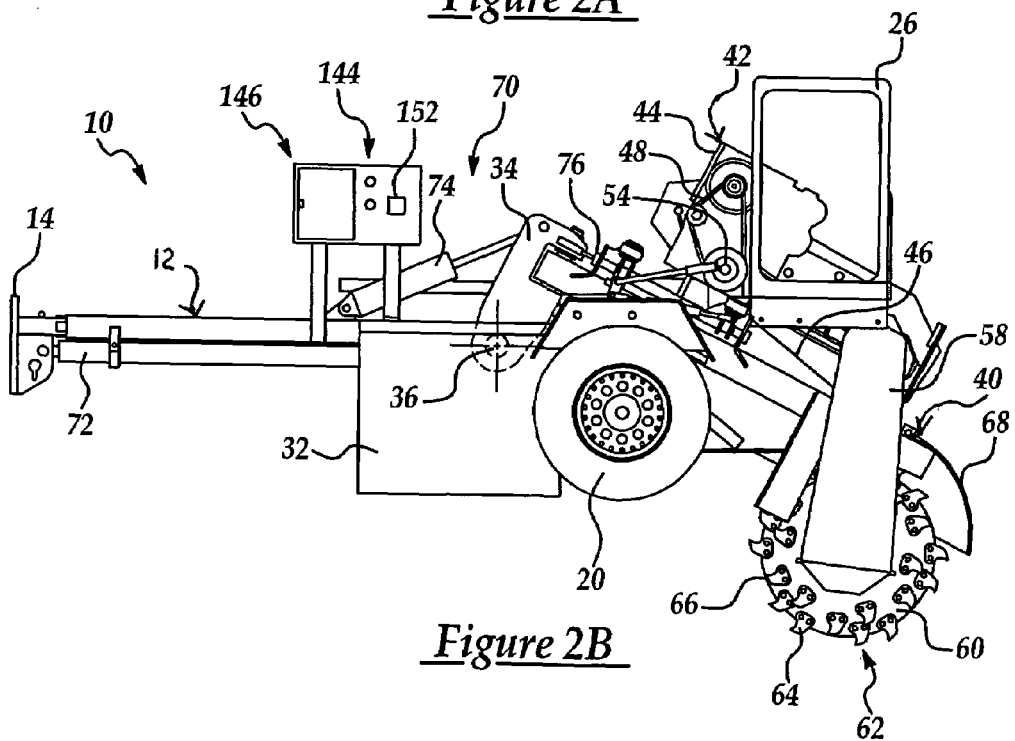
FIG. 2B is a view similar to FIG. 2A illustrating a downward vertical movement of a cutting assembly of the stump grinder.
Figure 3A:
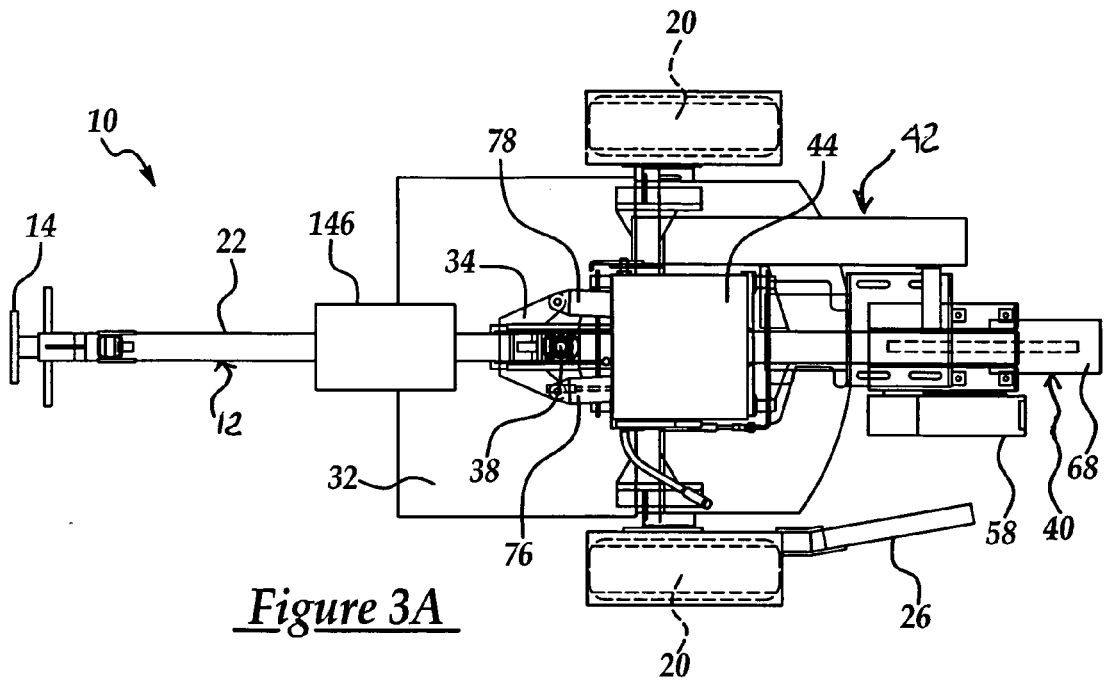
FIG. 3A is a plan view of the automatic reversing feed assembly and stump grinder of FIG. 1.
Figure 3B:
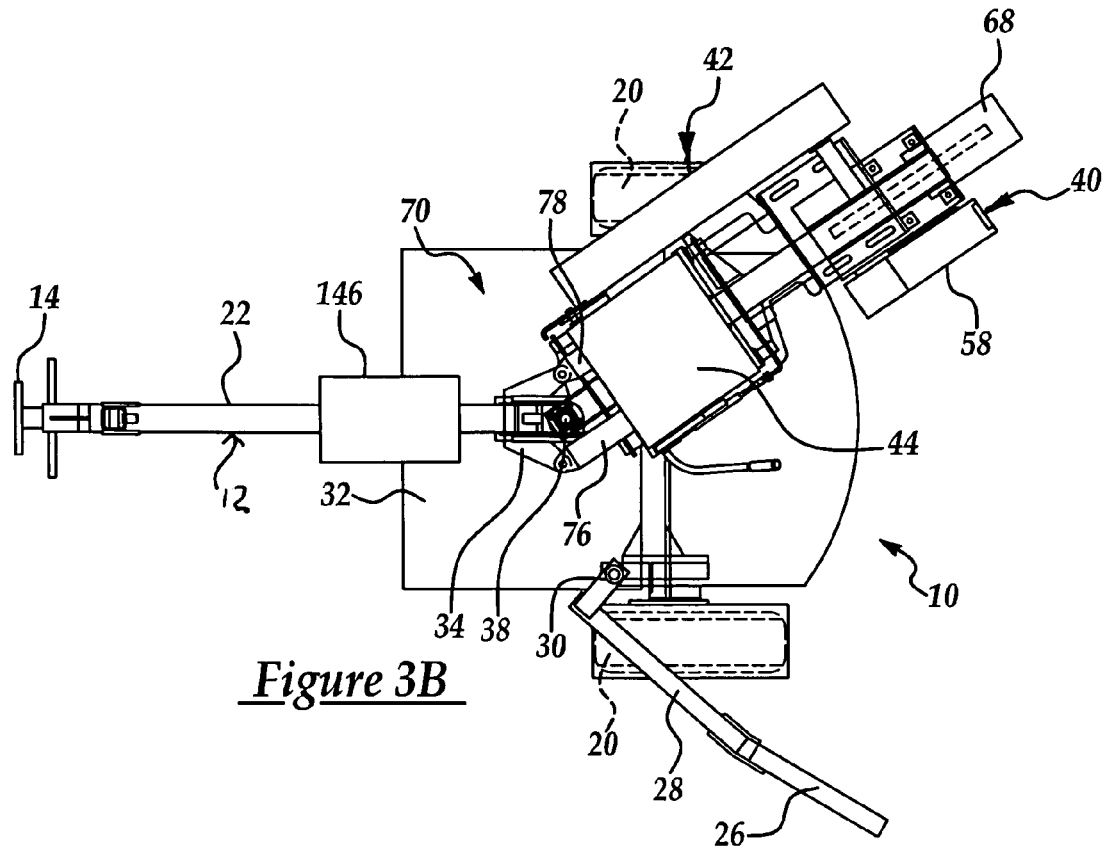
FIG. 3B is a view similar to FIG. 3A illustrating a lateral movement of the cutting assembly of the stump grinder.

The upper section 24 of the frame 12 is disposed over the lower section 22 and movable relative to the lower section 22. The frame 12 includes a connector member 34 pivotally attaching the upper section 24 to the lower section 22. The connector member 34 has a first pivot pin 36 disposed along a horizontal axis. The first pivot pin 36 permits the upper section 24 to move in a vertical manner relative to the lower section 22 (FIGS. 2A and 2B). The connector member 34 further includes a second pivot pin 38 disposed along a vertical axis. The second pivot pin 38 permits the upper section 24 to move in a lateral manner relative to the lower section 22 (FIGS. 3A and 3B). It should be appreciated that the pivoting feature of the frame 12 enables movement of the stump grinder 10 relative to the stump (S) for efficient operation. It should also be appreciated that, without the pivoting feature, the present invention would require a town vehicle (not shown) to re-position the stump grinder 10 to effectively remove the stump (S) from a landscape.

Both the upper and lower sections 22, 24 are generally constructed of metal such as steel and are generally rectangular in cross-section. It should be appreciated that the upper and lower sections 22, 24 of the frame 12 may be constructed from any material suitable for use in connection with stump grinding and may have any suitable cross-sectional shape. It should also be appreciated that, while the frame 12 is shown in a bisected manner, the frame 12 may be of a unitary construction and the pivoting feature maintained through pivotal movement of a cutting assembly, generally indicated at 40 and to be described, relative to the frame 12.

The stump grinder 10 further includes a drive assembly, generally indicated at 42. The drive assembly 42 is mounted to the frame 12 and adapted to drive the cutting assembly 40. The drive assembly 42 includes an engine 44 operatively coupled to the cutting assembly 40 by a drive mechanism (not shown). It should be appreciated that the drive mechanism may include a drive shaft, belt, or chain drive adapted to drive the cutting assembly 40.

Referring to FIGS. 1 through 3A, the drive assembly 42 further includes a pulley (not shown) disposed about one end of the drive mechanism and belts 46, 48 disposed over and interconnecting the pulleys 50, 52, 54. It should be appreciated that the engine 44 may be an internal combustion engine or may operate through some other manner. It should also be appreciated that while the engine 44 is shown operatively mounted to the upper section 24 of the frame 12, the engine 44 may be remotely located relative to the stump grinder 10 and operatively connected to the cutting assembly 40 by the drive assembly 42 such as in a power take-off (PTO) system (not shown).

The stump grinder 10 further includes a cutting assembly 40 operatively coupled to the drive assembly 42. The cutting assembly 40 includes a boom 58 operatively supported by the frame 12 at one end and a cutting wheel 60 rotatably connected at the other end of the boom 58. The cutting wheel 60 rotates relative to the boom 58 and includes a plurality of cutting teeth, generally indicated at 62, adapted to engage the stump (S). It should be appreciated that the cutting wheel 60 may be operatively coupled to the engine 44 by the drive mechanism (not shown).

As illustrated in FIGS. 1 through 2A, the cutting teeth 62 include a primary set 64 having a primary function of engaging the stump (S) and a secondary set 66 adjacent the primary set 64 for removing the comminuted material away from the primary set 64. The cutting assembly 40 further includes a guard 68 disposed adjacent and connected to the boom 58 to cover a top section of the cutting wheel 60. The guard 68 prevents comminuted material from being ejected in an upward manner. It should be appreciated that the cutting wheel 60 may include a plurality of a hooks, knives, or bars (not shown) to convert the stump (S) into comminuted material.

Referring now to FIGS. 1 through 4, the stump grinder 10 includes an actuating assembly, according to the present invention and generally indicated at 70. The actuating assembly 70 actuates movement of the cutting assembly 40 relative to the stump (S). The actuating assembly 70 is operatively connected to the connector member 34 and to the cutting assembly 40. In the illustrated embodiment, the actuating assembly 70 is powered by hydraulic fluid and is in operative communication with the drive assembly 42 to provide power for delivery of pressurized hydraulic fluid such as oil. It should be appreciated that the actuating assembly 70 may also be powered pneumatically or electrically.

The actuating assembly 70 further includes a pump 71 and a plurality of fluid cylinders 72, 74, 76, 78 fluidly connected to the pump 71. The pump 71 is operatively connected to the drive assembly 42 and/or engine 44 to pump pressurized fluid to the fluid cylinders 72, 74, 76, 78. Each of the fluid cylinders includes a head port 82, 86, 90, 94 and a rod port 84, 88, 92, 96, respectively, through which pressurized fluid is directed in/out of the fluid cylinders 72, 74, 76, 78 during actuation.

The fluid cylinders 72, 74, 76, 78 actuate movement of the cutting assembly 40 relative to the stump (S). Specifically, the fluid cylinder 72 is a tongue cylinder to actuate the stump grinder 10 in a fore and aft movement relative to the stump (S) (FIGS. 1 through 2A). The fluid cylinder 74 is a vertical cylinder to actuate the upper section 24 of the frame 12 in a vertical manner about the first pivot pin 36 (FIGS. 2A through 2B). The fluid cylinders 76 and 78 are a pair of swing cylinders to actuate the upper section 24 of the frame 12 in a lateral movement about the second pivot pin 38 (FIGS. 3A through 3B).

In the embodiment illustrated, the actuator assembly 70 includes the two fluid cylinders 76, 78 that act as swing cylinders for actuating the cutting wheel 60 in a lateral motion across the stump (S) while only one fluid cylinder 72 or 74 is employed for actuating the cutting wheel 60 in either a vertical or fore/aft motion. It should be appreciated that the stump grinder 10 may include any number of fluid cylinders 72, 74, 76, 78 to actuate a desired motion of the cutting assembly 40.

The actuating assembly 70 further includes a storage tank 98 fluidly connected to the pump 71. The storage tank 98 stores fluid to be supplied to the pump 71. The actuating assembly 70 also includes a control valve manifold 100 fluidly connected to the pump 71. The control valve manifold 100 receives pressurized fluid from the pump 71 and directs it to the appropriate fluid cylinder(s) 72, 74, 76, 78 to actuate the desired movement. Fluid from the storage tank 98 is directed to the pump 71 through a fluid line 102. Pressurized fluid from the pump 71 is directed toward the control valve manifold 100 by a fluid line 128. Fluid is directed to/from the control valve manifold 100 and to/from the fluid cylinders 72, 74, 76, 78 by fluid lines 104, 106, 108, 110, 112, 114. It should be appreciated that the fluid lines 112, 114 between the control valve manifold 100 and the fluid cylinders 76, 78 that act as swing cylinders include dividers 116, 118 to divide the fluid flow between the fluid cylinders 76, 78 and fluid lines 120, 122, 124, 126, respectively. It should also be appreciated that the components of the actuating assembly 70 are interconnected by a plurality of fluid lines.

The actuating assembly 70 includes an automatic reversing feed block, generally indicated at 130 and to be described. Pressurized fluid is directed from the automatic reversing feed block 130 to the control valve manifold 100 through another fluid line 132 and pressurized fluid is directed from the control valve manifold 100 to the automatic reversing feed block 130 through another fluid line 134. Pressurized fluid is also directed from the control valve manifold 100 to the storage tank 98 through a fluid line 136.

The actuating assembly 70 may also include a pressure relief valve 138 disposed between the fluid line 128 and the control valve manifold 100 or at any other location as may be necessary.

The stump grinder 10 further includes an automatic reversing feed assembly, according to the present invention and generally indicated at 140. The automatic reversing feed assembly 140 is operatively connected to the actuating assembly 70 to control the direction of the fluid flow. The automatic reversing feed assembly 140 is adapted to automatically reverse the operational movement of the cutting assembly 40 in response to an excessive load placed on the cutting assembly 40, engine 44, and/or the actuating assembly 70.

The automatic reversing feed assembly 140 includes at least one sensor 142 to sense excessive load placed on the stump grinder 10 during operation. The sensor 142 may be operatively connected to the drive assembly 42 to sense the rotation of the drive mechanism, speed of the engine 44, or other component of the drive assembly 42 suitable for sensing the operational load of the cutting assembly 40. Further, the sensor 142 may be operatively connected to the actuating assembly 70 to sense a level of fluid pressure therein. In either event, the sensor is 142 adapted to sense a change in the drive assembly 42 and/or actuating assembly 70 that correlates to an excessive load. In the case of the sensor 142 operatively connected to the drive assembly 42, a decrease in engine speed or drive mechanism rotation may be indicative of an excessive load. In the case of the sensor 142 operatively connected to the actuating assembly 70, an increase in fluid pressure may be indicative of an excessive load. It should be appreciated that, while the stump grinder 10 includes at least one sensor 142 to sense an excessive load placed on the stump grinder 10 during operation, more than one sensor 142 may be used to accomplish the same end. It should also be appreciated that, for example, one sensor 142 may be operatively connected to the drive assembly 42 and another sensor 142 may be operatively connected to the actuating assembly 70. It should further be appreciated that employment of at least one sensor 142 relative to both the drive assembly 42 and actuating assembly 70 may avoid false indications of an excessive load. It should still further be appreciated that, for example, one sensor 142 may be used on each fluid cylinder 72, 74, 76, 78 to identify the specific area bearing the excessive load.

The automatic reversing feed assembly 140 includes a control system, generally indicated at 144. The control system 144 is operatively connected to the sensor 142 by wiring 143 and receives a signal from the sensor 142 and transmits a signal to the automatic reversing feed block 130 to reverse the feed movement of the cutting assembly 40 to avoid overworking the engine 44. The control system 144 includes a controller 146 operatively connected to the actuating assembly 70. The controller 146 is operatively connected to the control valve manifold 100 by wiring 147 and to the automatic reversing feed block 130 by wiring 156 and transmits a signal to change the direction of fluid through either the control valve manifold 100 or the automatic reversing feed block 130 in response to user input, thereby controlling the operational movement of the cutting assembly 40.

Figure 4:
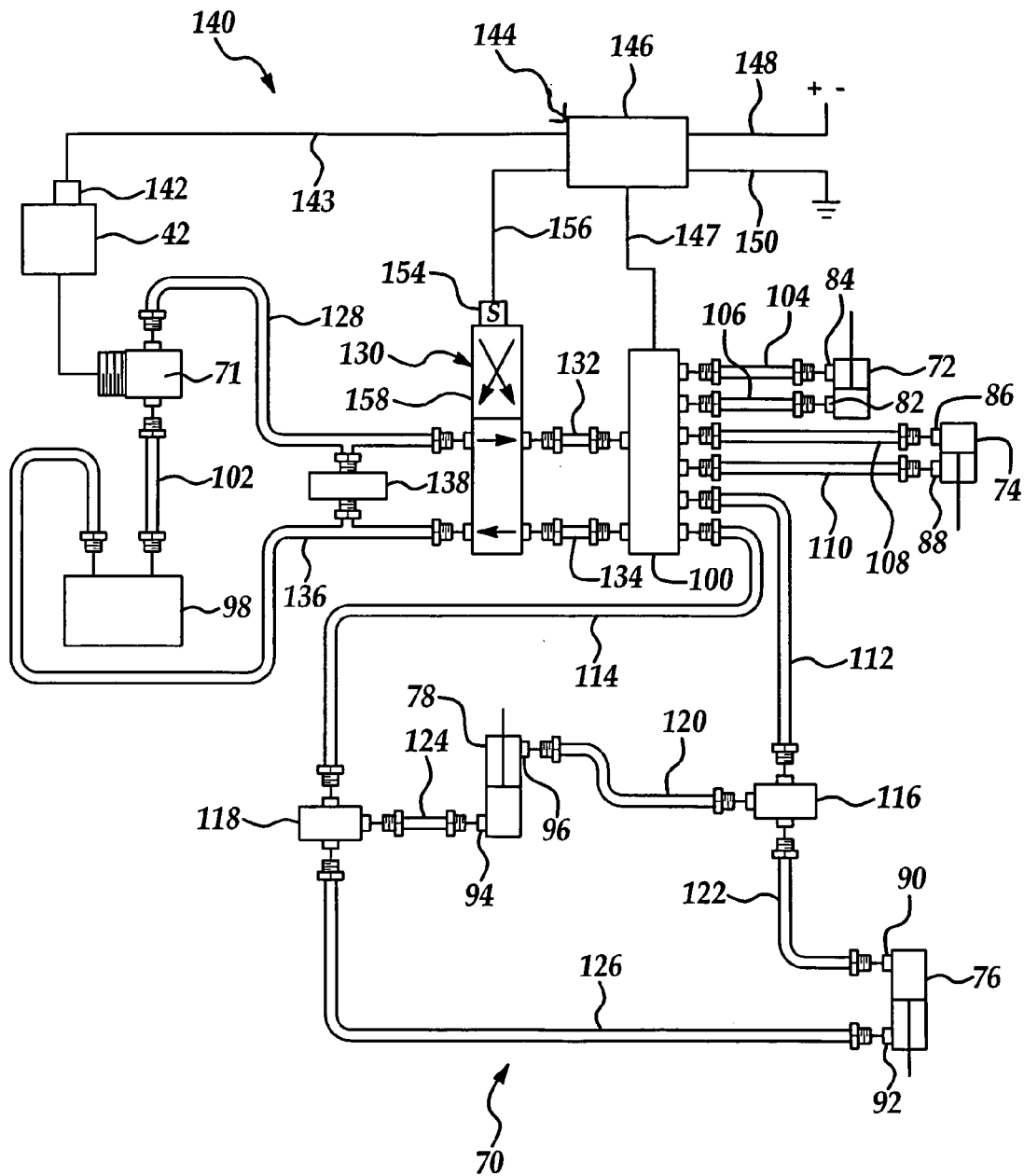
FIG. 4 is a schematic diagram of one embodiment of a control system of the automatic reversing feed assembly and actuating assembly of the stump grinder of FIG. 1.

The controller 146 may include a plurality of levers (not shown) that control the valves (not shown) within the control valve manifold 100 or may be in electronic communication with the control valve manifold 100 to accomplish the same end. As illustrated in FIG. 4, the controller 146 is in electric communication with the control valve manifold 100 and remaining components of the automatic reversing feed assembly 140. The controller 146 is connected by wiring 148 to a source of power such as a twelve-volt battery (not shown) and connected by wiring 150 to an electrical ground such as the frame 12.

Referring to FIGS. 1 through 2B, the controller 146 may include an input device (not shown) for inputting a time period for reversing the feed movement of the cutting assembly 40. The controller 146 further may include a display 152 for displaying the time for reversing the feed movement of the cutting assembly 40 by actuation of the fluid cylinders 72, 74, 76, 78. The controller 140 may be removed from the frame 12, while remaining hardwired to the control system 144 to provide the operator with a more suitable viewing angle of the operational movement of the cutting assembly 40. It should be appreciated that the controller 146 may also be a remote control unit adapted to communicate with the control system 144 through transmission and receipt of radio frequency signals, remote wired panel, or the like.

Referring to FIGS. 1 through 4, the automatic reversing feed assembly 140 further includes the automatic reversing feed block 130. The automatic reversing feed block 130 redirects pressurized fluid in response to excessive load placed on the stump grinder 10. The automatic reversing feed block 130 is operatively connected to the control system 144. The automatic reversing feed block 130 includes at least one solenoid 154 connected to the control system 144 by wiring 156. The solenoid 154 receives a signal from the control system 144 in response to an excessive load. The automatic reversing feed block 130 includes a feed valve 158 to reverse the direction of fluid flow to and from the control valve manifold 100. The automatic reversing feed block 130 remains in a redirecting mode until the signal relative to an excessive load is no longer received by the solenoid 154 or the signal is redirected to an opposing solenoid (not shown). At such time, the automatic reversing feed block 130 will return to the standard direction of fluid flow and the cutting assembly 40 may re-engage the stump (S). To avoid erratic movement of the cutting assembly 40 away from and toward the stump (S), the automatic reversing feed block 130 may operate in response to a programmed time period provided by the control system 144 as previously described. It should be appreciated that the automatic reversing feed block 130 may include a restrictor (not shown) to restrict the amount of fluid redirected to prevent erratic movement of the cutting assembly 40 relative to the stump (S). It should also be appreciated that the automatic reversing feed block 130 may also include a damper or damping system (not shown) to prevent erratic movement of the cutting assembly 40 relative to the stump (S) during re-engagement of the stump (S) following disengagement of same due to excessive load.

In operation of the stump grinder 10, an operator actuates the actuating assembly 70 through the controller 146. In response, the pump 71 pumps fluid from the storage tank 98 through the control valve manifold 100 and into the automatic reversing feed block 130 by the fluid lines 128 and 134. The automatic reversing feed block 130 directs the pressurized fluid to the appropriate fluid cylinder(s) 72, 74, 76, 78 to actuate the desired movement of the cutting assembly 40.

For example, if an operator desires to move or feed the cutting assembly 40 in a lateral motion toward the stump (s), the automatic reversing feed block 130 directs pressurized fluid toward the fluid cylinders 76, 78 through the fluid line 112, the divider 116, and the fluid lines 120, 122. The fluid line 122 directs pressurized fluid to the head port 90 of the fluid cylinder 76 while the fluid line 120 directs pressurized fluid to the rod port 96 of the other fluid cylinder 78. Pressurized fluid within the fluid cylinders 76, 78 on the side opposite the actuation is directed back to the control valve manifold 100 through fluid lines 124, 126 connected to the opposing head port 94, rod port 92, and fluid line 114. From the automatic reversing feed block 130, the returned fluid is directed through the control valve manifold 100 and to the storage tank 98 by the fluid line 136. It should be appreciated that actuation of the other fluid cylinders 72 or 74 can be accomplished in a similar manner, with the exception that since only one fluid cylinder actuates both the extension and return movement no divider is necessary.

During operation of the stump grinder 10, the drive assembly 42 rotates the cutting assembly 40 and the cutting assembly 40 is fed toward and engages the stump (S), thereby reducing the stump (S) to comminuted material. If an excessive load is placed on the stump grinder 10, the control system 144 receives an input signal from the sensor 142 indicating a reduction in power from the drive assembly 42, such as reduced rpm from the engine 44, reduced rpm of the drive mechanism (not shown), reduced power from the alternator (not shown), or an increase in fluid pressure in the actuating assembly 70. The control system 144 then sends a signal to the solenoid 154. The solenoid 154 directs the feed valve 158 to reverse the fluid flow path, causing pressurized fluid to be directed to the fluid cylinders 76 and 78 of the swing cylinder circuit through the fluid line 114 rather than through the fluid line 112. This causes the fluid cylinders 76, 78 to reverse their direction and actuate movement of the cutting assembly 40 in the opposite direction away from the stump (S), regardless of the feed direction desired by the operator. It should be appreciated that the feed direction of the cutting assembly 40 is reversed in response to the signal of an excessive load placed on the stump grinder 10.

Movement of the cutting assembly 40 may be actuated away from the stump (S) for a predetermined distance or for a predetermined time, which may be programmed into the control system 144 by the controller 146. The stump grinder 10 allows or waits for the engine 44 and/or drive assembly 42 to recover its speed and/or power, or the fluid pressure in the actuating assembly 70 to decrease below a predetermined pressure level. Once the engine 44 and/or drive assembly 42 has regained its normal operating rpm/power or the fluid pressure in the actuating assembly 70 returns to its normal operating pressure level, the control system 144 terminates the excessive load signal sent to the solenoid 154. The solenoid 154 causes the feed valve 158 to reactivate the normal fluid flow path, causing pressurized fluid to be directed to the normal operational or feed direction. This causes the fluid cylinder(s) 76, 78 to re-actuate or re-start feed movement of the cutting assembly 40 toward the stump (S). It should be appreciated that the control system 144 may include a damper or restrictor (not shown) to reduce the likelihood of erratic operation of the stump grinder 10 during re-engagement with the stump (S). It should also be appreciated that one or more solenoids may reverse oil flow direction via engagement or disengagement of electrical power.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A reversing automatic feed assembly for a stump grinder comprising:
   at least one sensor adapted to sense excessive load placed on said stump grinder and to output a signal thereof; and
   a control system operatively connected to said at least one sensor to automatically reverse movement of a cutting assembly in response to the signal from said at least one sensor.

2. A reversing automatic feed assembly as set forth in claim 1 wherein said at least one sensor is adapted to be connected to a drive assembly of the stump grinder to sense a speed of the drive assembly and signal said control system to reverse the movement of the cutting assembly when the speed of the drive assembly is below a predetermined value.

3. A reversing automatic feed assembly as set forth in claim 1 wherein said at least one sensor is adapted to be connected to an actuator assembly of the stump grinder to sense a fluid pressure within the actuator assembly and signal said control system to reverse the movement of the cutting assembly when the fluid pressure within the actuator assembly is above a predetermined level.

4. A reversing automatic feed assembly as set forth in claim 1 including an auto feed block to direct pressurized fluid within an actuating assembly of the stump grinder to facilitate the movement of the cutting assembly.

5. A reversing automatic feed assembly as set forth in claim 4 including a feed valve interconnecting said auto feed block and the actuating assembly to feed pressurized fluid thereto.

6. A reversing automatic feed assembly as set forth in claim 5 wherein said control system includes a controller operatively connected to said auto feed block to control the direction of pressurized fluid within the actuating assembly in response to user input.

7. A reversing automatic feed assembly as set forth in claim 6 wherein said controller is in electronic communication with said auto feed block and said at least one sensor to activate said auto feed block to reverse the direction of pressurized fluid through the actuating assembly despite user input.

8. A stump grinder comprising:
   a frame;
   a cutting assembly operatively supported by said frame;
   an actuating assembly operatively connected to said frame and said cutting assembly;
   an automatic reversing feed assembly operatively connected to said actuating assembly, said automatic reversing feed assembly including at least one sensor adapted to sense excessive load placed on said stump grinder during operation and output a signal thereof, and a control system operatively connected to said least one sensor to automatically reverse movement of said cutting assembly in response to the signal from said at least one sensor.

9. A stump grinder as set forth in claim 8 including a drive assembly operatively connected to said cutting assembly.

10. A stump grinder as set forth in claim 9 wherein said at least one sensor is operatively connected to said drive assembly to sense the speed of an engine of the stump grinder to signal said control system to reverse the movement of said cutting assembly by said actuating assembly when the speed of the engine is below a predetermined value.

11. A stump grinder as set forth in claim 8 wherein said at least one sensor is operatively connected to said actuating assembly to sense a fluid pressure within said actuating assembly to signal said control system to reverse the movement of said cutting assembly by said actuating assembly when the fluid pressure within said actuating assembly is above a predetermined level.

12. A stump grinder as set forth in claim 8 wherein said automatic reversing feed assembly includes an auto feed block operatively connected to said control system and to said actuating assembly.

13. A stump grinder as set forth in claim 12 wherein said control system includes a controller operatively connected to said actuating assembly to control the direction of pressurized fluid within said actuating assembly in response to user input.

14. A stump grinder as set forth in claim 13 wherein said controller is in electronic communication with said auto feed block to activate said auto feed block to redirect pressurized fluid through said actuating assembly despite user input.

15. A stump grinder as set forth in claim 14 wherein said automatic reversing feed assembly includes a feed valve to reverse the direction of pressurized fluid within said actuating assembly.

16. A stump grinder as set forth in claim 15 wherein said controller includes an input device for inputting a recovery setting for reversing the feed movement of said cutting assembly.

17. A stump grinder as set forth in claim 16 wherein said controller includes a display for displaying the recovery setting for reversing the feed movement of said cutting assembly.

18. A stump grinder as set forth in claim 8 wherein said actuating assembly includes a plurality of fluid cylinders to actuate movement of said cutting assembly relative to the stump.

19. A stump grinder as set forth in claim 18 wherein said actuating assembly further includes a pump to transfer pressurized fluid to said fluid cylinders.

20. A stump grinder as set forth in claim 19 wherein said actuating assembly further includes a storage tank fluidly connected to said pump and said fluid cylinders to store fluid therein.

21. A stump grinder as set forth in claim 20 wherein said actuating assembly further includes a plurality of fluid lines interconnecting said pump, said storage tank, and each of said fluid cylinders.

22. A method of automatically reversing movement of a cutting assembly for a stump grinder, said method comprising the steps of:
   engaging a stump with the cutting assembly;
   sensing a load placed on the stump grinder;
   reversing direction of the cutting assembly away from the stump when the load placed on the stump grinder is above a predetermined value;
   sensing that the load placed on the cutting assembly is equal to or less than the predetermined value; and
   re-engaging the stump with the cutting assembly.

* * * * *